United States Patent Office 3,145,072
Patented Aug. 18, 1964

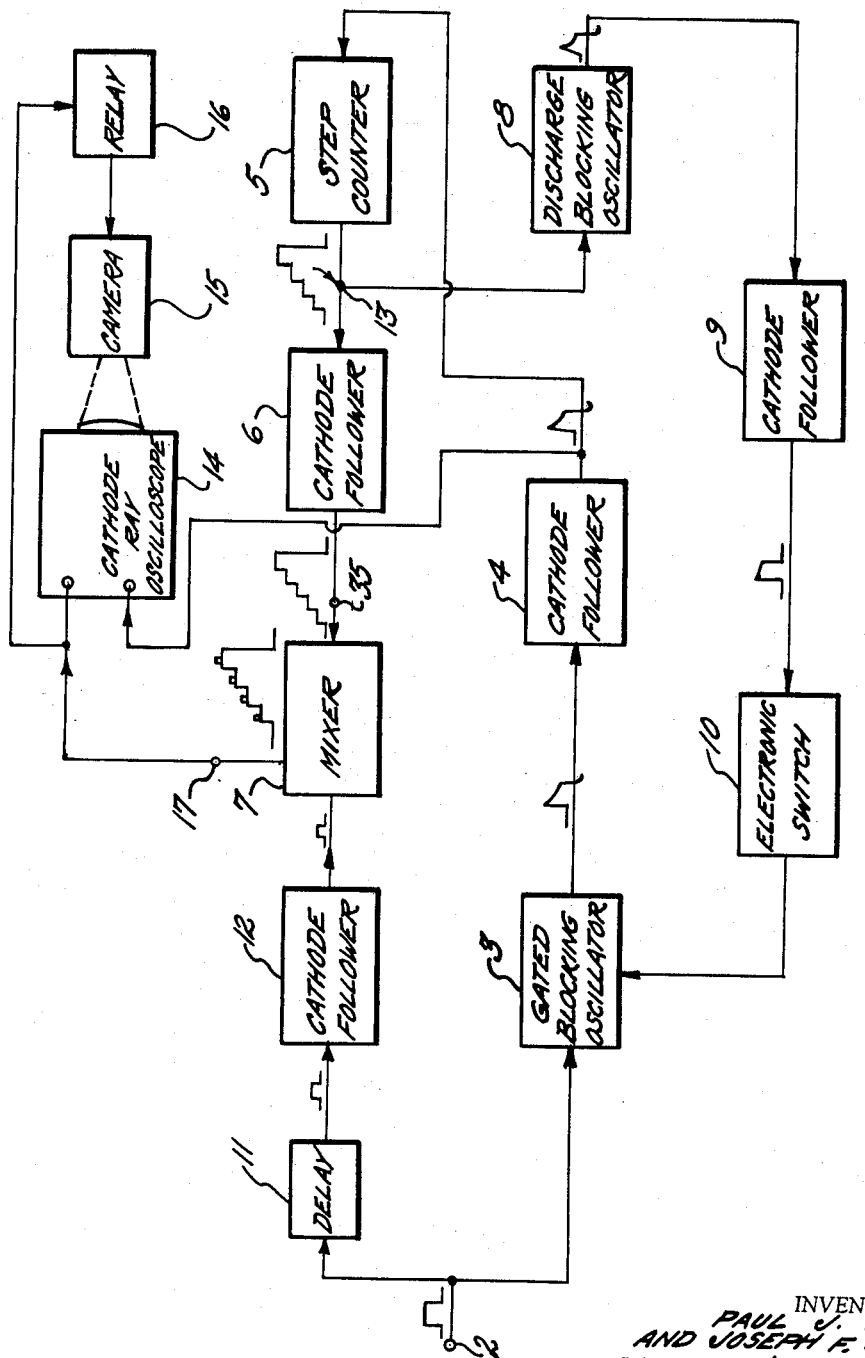

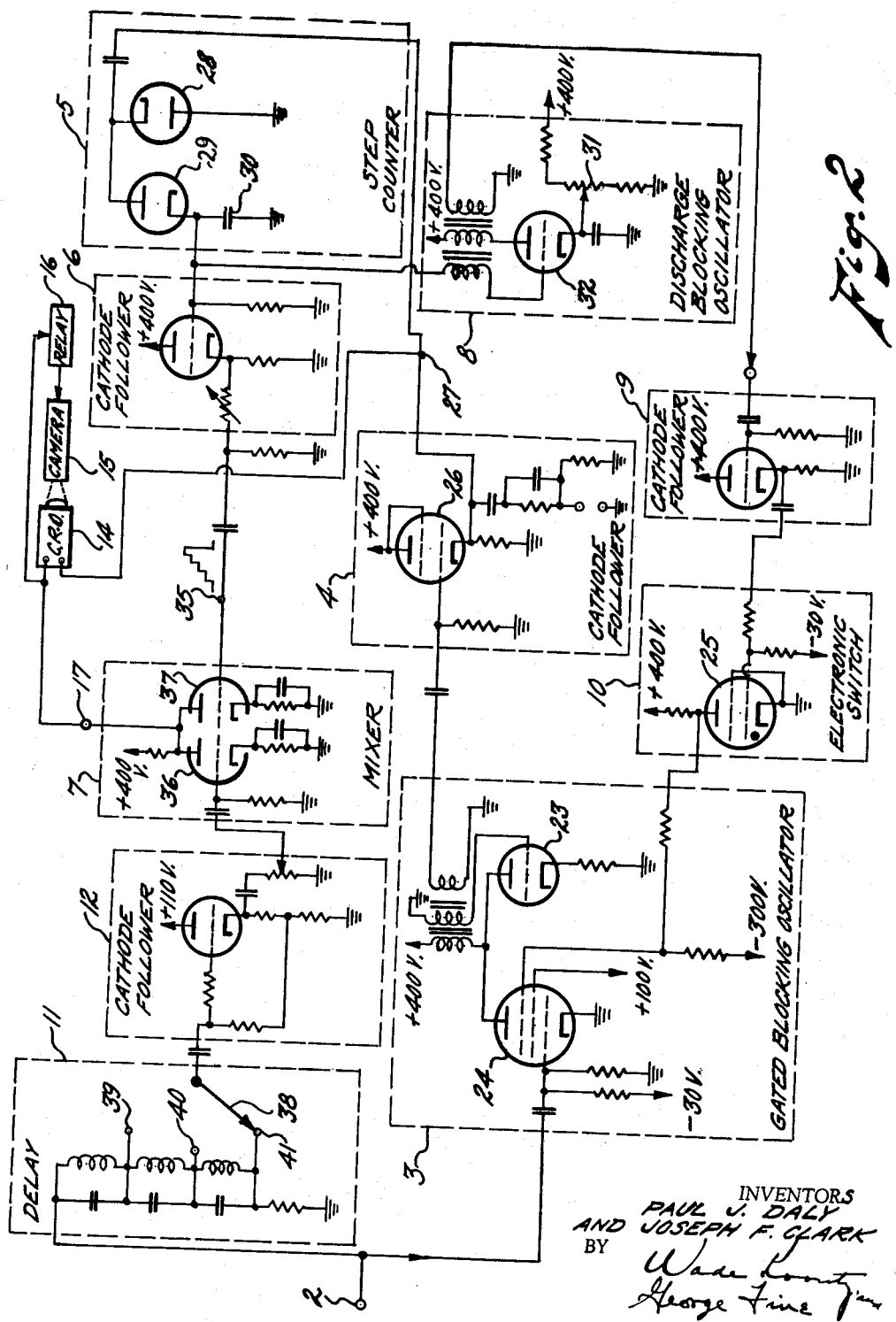

3,145,072
PHOTOGRAPHIC RECORDER
Paul J. Daly, Quincy, and Joseph F. Clark, Lexington, Mass., assignors to the United States of America as represented by the Secretary of the Air Force
Original application Feb. 27, 1962, Ser. No. 176,159. Divided and this application Sept. 10, 1963, Ser. No. 308,040
5 Claims. (Cl. 346—110)
(Granted under Title 35, U.S. Code (1952), sec. 266)

The invention described herein may be manufactured and used by or for the United States Government for governmental purposes without payment to us of any royalty thereon.

This invention relates to a system for displaying on a cathode ray oscilloscope a series of pulses and, more particularly, for producing a series of pulses superimposed on a stepped-output signal for display on aforesaid oscilloscope and a camera interconnected with said system to photographically record the stepped display. This application is a division of our copending patent application bearing Serial Number 176,159 which was filed February 27, 1962.

During the operation of many electronic systems, there are generated a multiplicity of pulses. It is highly desirable to simultaneously view and permanently record a series of aforesaid pulses so that changes in amplitude, pulsewidth, jitter, etc. could be noted. The comparison of a series of successive pulses achieved thereby provides an invaluable aid in the performance of a transient analysis.

The present invention provides an electronic signal analyzer system for displaying on a cathode ray oscilloscope a series of successive pulses superimposed on a stepped-output signal and a camera interconnected with aforesaid system to photographically record the series of pulses being analyzed. The series of pulses to be analyzed are applied to a pair of input circuits. The first of the pair of input circuits provides a time delay for the series of pulses being analyzed. The second input circuit accepts the series of pulses; the first pulse and each successive pulse of the series triggers the sweep of the cathode ray oscilloscope.

The series of pulses are utilized to generate a stepped-output signal which is mixed with the delayed series of pulses to produce a signal which is stepped and in which each step has superimposed thereupon one of the pulses of said series of delayed pulses. An electronic switch is utilized to shut off the second input circuit after the step counter has reached a predetermined number of steps. The first step of the stepped-output signal actuates a relay thereby operating to open the shutter of the aforesaid camera. After the last step of the stepped signal, the camera shutter is closed as the relay has been deprived of an actuating signal.

An object of the present invention is to provide a novel system for displaying and photographing a series of successive pulses.

Another object of the present invention is to provide a system for viewing simultaneously a series of successive pulses wherein each pulse of said series is utilized to generate a pulse thereby producing a stepped-output signal, the first and last of the steps actuating a camera.

Still another object of the present invention is to provide a system for viewing and recording a series of successive pulses simultaneously appearing on the face of a cathode ray tube of an oscilloscope wherein the first of the pulses turns on trigger source for the sweep of aforesaid oscilloscope and the last of the pulses shuts off the trigger source.

Yet another object of the present invention is to provide a system which displays and photographs simultaneously a series of successive pulses wherein the series of pulses are superimposed upon a stepped-output signal and in which the first and last steps control a camera which is utilized to photograph the display of said superimposed signals.

The various features of novelty which charaterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Of the drawings:
FIGURE 1 illustrates in block diagram form a preferred embodiment of the invention; and
FIGURE 2 is a schematic diagram of the invention.

Now referring in detail to FIGURE 1, there is shown gated blocking oscillator 3 receiving pulses (as illustrated) by way of common input terminal 2. For each input pulse, gated blocking oscillator 3 produces a pulse at its output which is fed through cathode follower 4 to the external synchronization input of cathode ray oscilloscope 14 and simultaneously to step counter 5 and each of the pulses generates a sweep in the cathode ray tube of oscilloscope 14. Step counter 5 produces at point 13 a stepped output, each step representing an individual input pulse into step counter 5. From point 13, the stepped output signal is fed to discharge blocking oscillator 8 and simultaneously to mixer 7 by way of cathode follower 6. The amplitude of the bias voltage on discharge blocking oscillator 8 is preselected so that when the stepped output signal applied thereto reaches a predetermined magnitude, discharge blocking oscillator 8 conducts thereby generating a single pulse which is applied to electronic switch 10 by way of cathode follower 9. Electronic switch 10, upon receipt of an input pulse, prevents gated blocking oscillator 3 from conducting which in turn shuts off the trigger source for the oscilloscope sweep and also the pulse source to step counter 5.

It is to be noted that prior to the generation of a pulse from discharge blocking oscillator 8, a stepped output signal has been introduced into mixer 7, simultaneously the aforementioned mixer has received pulses from cathode follower 12 by way of delay 11. Delay 11 receives a series of pulses from common input terminal 2. Mixer 7 superimposes a delayed input pulse on each step of the stepped input signal applied thereto. The output signal from mixer 11 is then a stepped output voltage, each step having superimposed thereupon a delayed pulse. The superimposed signal is applied to the vertical amplifier terminal of cathode ray oscilloscope 14.

Oscilloscope camera is arranged to photograph the face of the cathode ray oscilloscope 14. Associated with camera 15 is relay 16 which is positioned so that the shutter of camera 15 is normally closed. The stepped-output signal from mixer 7, shown at point 17, is fed to relay 16, and the initial step thereof actuates relay 16 to open the shutter of camera 15 and after the last step thereof the voltage goes to zero thus operating to close the shutter of camera 15. There is thus provided a system whereby a series of pulses are displayed on the face of a cathode ray oscilloscope, each pulse being displaced vertically from the other. The first and last step of the superimposed stepped signal actuates a camera to automatically photograph aforesaid series of pulses.

Now referring to FIGURE 2, there is shown a schematic diagram of FIGURE 1 in which common input pulses are applied to terminal 2', the pulses then are fed to gated blocking oscillator 3' which is represented by electron discharge devices 23 and 24 with their associated circuitry. Electronic switch 10' is represented by electron discharge device 25 and associated circuitry. The plate of electron discharge device 25 is initially at +400 volts. By virtue of this, the voltage divider output from the aforesaid plate to the gated grid of electron discharge device 24 is above the positive potential needed for gating purposes. Therefore gated blocking oscillator 3' delivers a pulse to cathode follower 4', which includes electron discharge device 26. At point 27, a trigger voltage for cathode ray oscilloscope 14' is derived. The oscilloscope, being connected to external synchronization, receives a trigger and generates a sweep. Step counter 5' represented by electron discharge devices 28 and 29 and associated circuitry also receives aforesaid trigger. During this period, capacitor 30 which is part of the step counter builds up a charge each time a pulse arrives, and depending upon the setting of potentiometer 31, there may be counted a predetermined number of pulses. The setting of potentiometer 31 adjusts the bias voltage for blocking oscillator 8', represented by electron discharge device 32 and associated circuitry. When the charge of capacitor 30 is high enough to overcome the bias voltage on electron device 32, the latter conducts, generating a single pulse from the tertiary winding of blocking oscillator 8'. This pulse is coupled over to electronic switch 10' by way of cathode follower 9' and electron discharge device 25 conducts. The plate voltage of electron discharge device 25 drops to a very low value. Therefore point 34 is now negative and gated blocking oscillator 3' does not conduct which in turn shuts off the trigger source to oscilloscope 14' and also the pulse source to step counter 5'.

It is to be noted that prior to the generation of the pulse from blocking oscillator 8', a stepped output signal at point 35 is present. Aforesaid stepped output signal contains a predetermined number of steps. This stepped output signal is introduced to electron discharge device 37 of mixer 7' by way of cathode follower 6'. Mixer 7' is represented by electron discharge devices 36 and 37 and associated circuitry. Simultaneously electron discharge device 36 of mixer 7 receives pulses by way of cathode follower 12' from delay 11'. Delay 11' receives input pulse from terminal 2'. Delay 11' is comprised of single pole-three position switch 38 and associated inductors, resistor and capacitors. Switch 38 can connect cathode follower 12' to input terminal 2' by way of position 39, 40, or 41 thus providing three different delays for the input pulse received by way of terminal 2'.

The delayed pulses are fed into electron discharge device 36 and simultaneously a stepped signal is applied to electron discharge device 37 of mixer 7'. The output signal from mixer 7' is comprised of a stepped output signal, each of the steps having superimposed thereupon a pulse. The stepped pulse with superimposed pulses is displayed on cathode ray oscilloscope 14' and is photographed as hereinbefore described in the detailed operation of FIGURE 1.

While, in accordance with the provisions of the statutes, we have illustrated and described the best forms of the invention now known to us, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described our invention, what we claim as new and desired to secure by Letters Patent, is as follows:

1. An electronic signal analyzer comprising means to display a series of pulses simultaneously on the face of a cathode ray tube of an oscilloscope, each pulse of said series being successively displaced from the other in the vertical direction, means to trigger the sweep of said cathode ray oscilloscope with each pulse of said series of pulses, electronic switching means to switch off said sweep subsequent to said last pulse, and means to photograph said simultaneous display, said photographing means including a camera having a shutter and positioned to photograph said simultaneous display, a relay arranged so that said shutter is normally closed, said relay being actuated by the first pulse of said series to open said shutter and upon the termination of the last pulse of said series said actuation being eliminated said shutter closes.

2. An electronic signal analyzer comprising means to generate a stepped signal from a predetermined number of pulses, each of said pulses being represented by a single step, means to superimpose on each of said steps a single pulse from said predetermined number of pulses, means to display said superimposed signal on the face of a cathode ray oscilloscope, and means to photograph said display of said superimposed signal, said photographing means including a camera having a shutter and positioned to photograph said superimposed display, a relay arranged so that said shutter is normally closed, said relay being actuated by the first superimposed pulse to open said shutter and upon the termination of the last superimposed pulse said actuation being eliminated said shutter closes.

3. An electronic signal analyzer comprising means to generate a stepped signal from a series of pulses, each of said pulses being represented by a single step, means to superimpose on each of said steps the pulse representative thereof, means to trigger the sweep of a cathode ray oscilloscope with each of said pulses of said series, electonic switching means to switch off said sweep of said oscilloscope after the last pulse of said series, means to display said superimposed signal on the face of said cathode ray oscilloscope, and means to photograph said display of said superimposed signal, said photographing means including a camera having a shutter and positioned to photograph said superimposed signal display, a relay arranged so that said shutter is normally closed, said relay being actuated by the first superimposed pulse of said series and upon the termination of the last superimposed pulse of said series said actuation being terminated said shutter closes.

4. An electronic signal analyzer comprising means to generate a stepped signal from a series of pulses to be analyzed, each of said pulses being represented by a step, means to delay said series of pulses, means to superimpose each of said delayed pulses upon the step representative thereof, means to trigger the sweep of a cathode ray oscilloscope for each of said pulse of said series of pulses, electronic switching means to switch off said triggering means after the last pulse of said series, means to display said superimposed signal on said cathode ray oscilloscope, and means to photograph said display of said superimposed signal, said photographing means including a camera having a shutter and positioned to photograph said display of said superimposed signal, a relay arranged so that said shutter is normally closed, said relay being actuated by the first pulse on the first step of said series to open said shutter and upon the termination of the last pulse on the last step of said series said actuation being terminated said shutter closes.

5. An electronic signal analyzer, in combination with a cathode ray oscilloscope and a camera, comprising means to generate a successively stepped signal from a series of pulses, each step being representative of a single pulse of said series, means to trigger the sweep of said cathode ray oscilloscope with each pulse of said series of pulses, electronic switching means to switch off said triggering means, said switching being controlled by the last step of said stepped signal, means to delay each pulse of said series of pulses, means to superimpose each of said delay pulses upon the step of said stepped signal representative thereof, means to display said superimposed signal on said cathode ray oscilloscope, and means to photograph said superimposed signal display, said photographing means including a camera having a shutter and positioned to photograph said superimposed signal display, a relay arranged so that said shutter is normally closed, said relay being actuated by the first pulse on the first step of said series to open said shutter and upon the termination of the last pulse on the last step of said series said actuation being terminated said shutter closes.

References Cited in the file of this patent

UNITED STATES PATENTS

| | | |
|---|---|---|
| 2,186,268 | Pakala | Jan. 9, 1940 |
| 2,561,612 | Culver | July 24, 1951 |
| 2,680,148 | Purington et al. | June 1, 1954 |
| 2,751,275 | Mansberg | June 19, 1956 |
| 2,832,072 | Hales et al. | Apr. 22, 1958 |
| 2,890,923 | Huebner | June 16, 1959 |
| 2,909,772 | Thornton | Oct. 20, 1959 |
| 3,047,870 | Bousky | July 31, 1962 |
| 3,067,407 | Schaaf | Dec. 4, 1962 |
| 3,102,769 | Hickey et al. | Sept. 3, 1963 |